United States Patent
Millin et al.

(10) Patent No.: US 12,266,054 B2
(45) Date of Patent: Apr. 1, 2025

(54) SYSTEM AND METHODS FOR IMPROVED AERIAL MAPPING WITH AERIAL VEHICLES

(71) Applicant: DroneDeploy, Inc., Santa Clara, CA (US)

(72) Inventors: Jonathan James Millin, Santa Clara, CA (US); Nicholas Pilkington, Santa Clara, CA (US); Devin Lane, Santa Clara, CA (US); Christopher Sullivan, Santa Clara, CA (US); Michael Winn, Santa Clara, CA (US)

(73) Assignee: Drone Deploy, Inc., San Francisco, CA (US)

(*) Notice: Subject to any disclaimer, the term of this patent is extended or adjusted under 35 U.S.C. 154(b) by 0 days.

(21) Appl. No.: 17/860,761

(22) Filed: Jul. 8, 2022

(65) Prior Publication Data
US 2022/0343599 A1  Oct. 27, 2022

Related U.S. Application Data

(63) Continuation of application No. 17/382,747, filed on Jul. 22, 2021, which is a continuation of application (Continued)

(51) Int. Cl.
*G06T 17/05* (2011.01)
*B64U 101/32* (2023.01)
(Continued)

(52) U.S. Cl.
CPC .............. *G06T 17/05* (2013.01); *G01C 11/34* (2013.01); *G05D 1/0094* (2013.01); *G05D 1/689* (2024.01);
(Continued)

(58) Field of Classification Search
CPC .............. B64C 39/024; B64U 2101/30; B64U 2201/10; G01C 11/34; G05D 1/0094;
(Continued)

(56) References Cited

U.S. PATENT DOCUMENTS

| | | |
|---|---|---|
| 6,151,539 A | 11/2000 | Bergholz et al. |
| 8,280,633 B1 | 10/2012 | Eldering et al. |

(Continued)

FOREIGN PATENT DOCUMENTS

EP  3158396 B1 * 3/2019 ............. B64D 47/08

OTHER PUBLICATIONS

DJ I Phantom 2 Vision + Training—Checklists (https:///dronelife.com/2014/10/17/ultimate-preflight-checklist-phanton2-vision) (Year 2014).

(Continued)

*Primary Examiner* — Anner N Holder
(74) *Attorney, Agent, or Firm* — Bookoff McAndrews, PLLC

(57) ABSTRACT

A method for image generation, preferably including: generating a set of mission parameters for a UAV mission of the UAV associated with aerial scanning of a region of interest; controlling the UAV to perform the mission; generating an image subassembly corresponding to the mission; and/or rendering the image subassembly at a display.

18 Claims, 7 Drawing Sheets

Related U.S. Application Data

No. 16/805,415, filed on Feb. 28, 2020, now Pat. No. 11,107,275, which is a continuation of application No. 15/887,832, filed on Feb. 2, 2018, now Pat. No. 10,621,780.

(60) Provisional application No. 62/453,926, filed on Feb. 2, 2017.

(51) Int. Cl.
| | |
|---|---|
| *G01C 11/34* | (2006.01) |
| *G05D 1/00* | (2024.01) |
| *G05D 1/689* | (2024.01) |
| *G06V 20/13* | (2022.01) |
| *G08G 5/00* | (2006.01) |

(52) U.S. Cl.
CPC ........... *G06V 20/13* (2022.01); *G08G 5/0013* (2013.01); *G08G 5/0021* (2013.01); *G08G 5/0034* (2013.01); *G08G 5/006* (2013.01); *G08G 5/0069* (2013.01); *G08G 5/0086* (2013.01); *B64U 2101/32* (2023.01)

(58) Field of Classification Search
CPC ...... G06T 17/05; G06V 20/13; G08G 5/0013; G08G 5/0021; G08G 5/0034; G08G 5/006; G08G 5/0069; G08G 5/0086
See application file for complete search history.

(56) References Cited

U.S. PATENT DOCUMENTS

| | | | |
|---|---|---|---|
| 8,497,905 B2 | 7/2013 | Nixon | |
| 8,626,361 B2 | 1/2014 | Gerlock | |
| 8,897,543 B1 | 11/2014 | Lin et al. | |
| 8,965,107 B1 | 2/2015 | Schpok et al. | |
| 8,965,598 B2 | 2/2015 | Kruglick | |
| 9,201,424 B1* | 12/2015 | Ogale | G05D 1/0253 |
| 9,266,611 B2 | 2/2016 | Rambo | |
| 9,346,543 B2 | 5/2016 | Kugelmass | |
| 9,346,544 B2 | 5/2016 | Kugelmass | |
| 9,352,833 B2 | 5/2016 | Kruglick | |
| 9,651,920 B2 | 5/2017 | Jang et al. | |
| 9,836,885 B1* | 12/2017 | Eraker | G06F 16/951 |
| 10,339,639 B2 | 7/2019 | Christ et al. | |
| 10,515,458 B1 | 12/2019 | Yakimenko et al. | |
| 2001/0038718 A1* | 11/2001 | Kumar | G06T 3/4038 |
| | | | 382/284 |
| 2002/0120474 A1 | 8/2002 | Hele et al. | |
| 2003/0218674 A1 | 11/2003 | Zhao et al. | |
| 2004/0139470 A1 | 7/2004 | Treharne | |
| 2005/0197981 A1* | 9/2005 | Bingham | G06N 3/045 |
| | | | 706/20 |
| 2006/0239537 A1 | 10/2006 | Shragai et al. | |
| 2009/0003691 A1 | 1/2009 | Padfield et al. | |
| 2009/0012995 A1 | 1/2009 | Sartor et al. | |
| 2009/0110241 A1 | 4/2009 | Takemoto et al. | |
| 2009/0110267 A1* | 4/2009 | Zakhor | G06T 7/75 |
| | | | 382/154 |
| 2010/0004802 A1 | 1/2010 | Bodin et al. | |
| 2011/0064312 A1 | 3/2011 | Janky et al. | |
| 2011/0228047 A1 | 9/2011 | Markham et al. | |
| 2011/0270484 A1 | 11/2011 | Grube | |
| 2012/0038770 A1 | 2/2012 | Azulai et al. | |
| 2012/0314068 A1 | 12/2012 | Schultz | |
| 2013/0004017 A1 | 1/2013 | Medasani et al. | |
| 2013/0052994 A1 | 2/2013 | Hayward et al. | |
| 2013/0235199 A1 | 9/2013 | Nixon | |
| 2013/0282208 A1 | 10/2013 | Mendez-Rodriguez et al. | |
| 2014/0219514 A1 | 8/2014 | Johnston et al. | |
| 2014/0253375 A1* | 9/2014 | Rudow | G01S 19/485 |
| | | | 342/357.51 |
| 2014/0267397 A1* | 9/2014 | Wagner | G06T 7/246 |
| | | | 382/103 |
| 2014/0316616 A1 | 10/2014 | Kugelmass | |
| 2015/0009206 A1 | 1/2015 | Arendash et al. | |
| 2015/0036888 A1 | 2/2015 | Weisenburger | |
| 2015/0070392 A1 | 3/2015 | Azulai et al. | |
| 2015/0120878 A1 | 4/2015 | Horgan et al. | |
| 2015/0226575 A1 | 8/2015 | Rambo | |
| 2015/0243073 A1 | 8/2015 | Chen et al. | |
| 2015/0248584 A1 | 9/2015 | Greveson et al. | |
| 2015/0248759 A1 | 9/2015 | Lin et al. | |
| 2015/0319769 A1 | 11/2015 | Grabowsky et al. | |
| 2015/0336671 A1 | 11/2015 | Winn et al. | |
| 2015/0367958 A1* | 12/2015 | Lapstun | H04N 23/54 |
| | | | 348/144 |
| 2016/0046373 A1 | 2/2016 | Kugelmass | |
| 2016/0046374 A1 | 2/2016 | Kugelmass | |
| 2016/0150142 A1 | 5/2016 | Lapstun et al. | |
| 2017/0012697 A1 | 1/2017 | Gong et al. | |
| 2017/0039765 A1* | 2/2017 | Zhou | G06T 7/521 |
| 2017/0083024 A1 | 3/2017 | Reijersen Van Buuren | |
| 2017/0084037 A1 | 3/2017 | Barajas Hernandez et al. | |
| 2017/0109577 A1 | 4/2017 | Wang et al. | |
| 2017/0138733 A1* | 5/2017 | Michiels | H04N 23/11 |
| 2017/0178358 A1 | 6/2017 | Greveson et al. | |
| 2017/0205826 A1 | 7/2017 | Smith et al. | |
| 2017/0206648 A1* | 7/2017 | Marra | B64D 47/08 |
| 2018/0356492 A1 | 12/2018 | Hamilton | |
| 2019/0026919 A1 | 1/2019 | Aratani | |
| 2019/0155302 A1 | 5/2019 | Lukierski et al. | |

OTHER PUBLICATIONS

Chapter 10, Principles of Photogrammetry, Mar. 31, 1993, https://www.lpl.ariaona.edu/hamilton/sites/lpl.arizona.edu.hamilton/files/courses/ptys551/Principles_of_Photogrammetry.pdf, pp. 10.1-10-19.

International Search Report and Written Opinion of the ISA, dated Apr. 12, 2018, for application No. PCT US18/016721.

Ciresan, Dan , et al., "Multi-column Deep Neural Networks for Image Classification," Mar. 28, 2012, pp. 1-8.

Goddemeier, Niklas , et al., "Coverage Evaluation of Wireless Networks for Unmanned Aerial Systems", IEEE Globecom 2010 Workshop on Wireless Networking for Unmannaed Aerial Vehicles.

Laliberte, Andrea S., et al., "Acquisition Orthorectification, and Object-based Classification of Unmanned Aerial Vehicle (UAV) Imagery for Rangeland Monitoring", Photogrammetric Engineering & Remote Sensing, Vo. 76, No. 6, Jun. 2010, pp. 661-672.

Skaloud, J. , et al., "Exterior Orientation by Direct Measurement of Camera Position and Attitude", International Archives of Photogrammetry and Remote Sensing, vol. XXX1, Part B3, 1996, pp. 125-130.

* cited by examiner

SYSTEM AND METHODS FOR IMPROVED AERIAL MAPPING WITH AERIAL VEHICLES

CROSS-REFERENCE TO RELATED APPLICATION(S)

This application is a continuation of U.S. application Ser. No. 17/382,747, filed Jul. 22, 2021, which is a continuation of U.S. application Ser. No. 16/805,415, filed Feb. 28, 2020, now U.S. Pat. No. 11,107,275, which is a continuation of U.S. application Ser. No. 15/887,832, filed on Feb. 2, 2018, now U.S. Pat. No. 10,621,780, which claims the benefit of priority to U.S. Provisional Patent Ser. No. 62/453,926, filed on Feb. 2, 2017, each of which is incorporated in its entirety by this reference.

TECHNICAL FIELD

This invention relates generally to the field of unmanned aerial vehicles and more specifically to a new and useful system and methods for improved aerial mapping with aerial vehicles.

DESCRIPTION OF THE EMBODIMENTS

The following description of the embodiments of the invention is not intended to limit the invention to these embodiments, but rather to enable any person skilled in the art to make and use this invention.

1. Method

Figure 1:
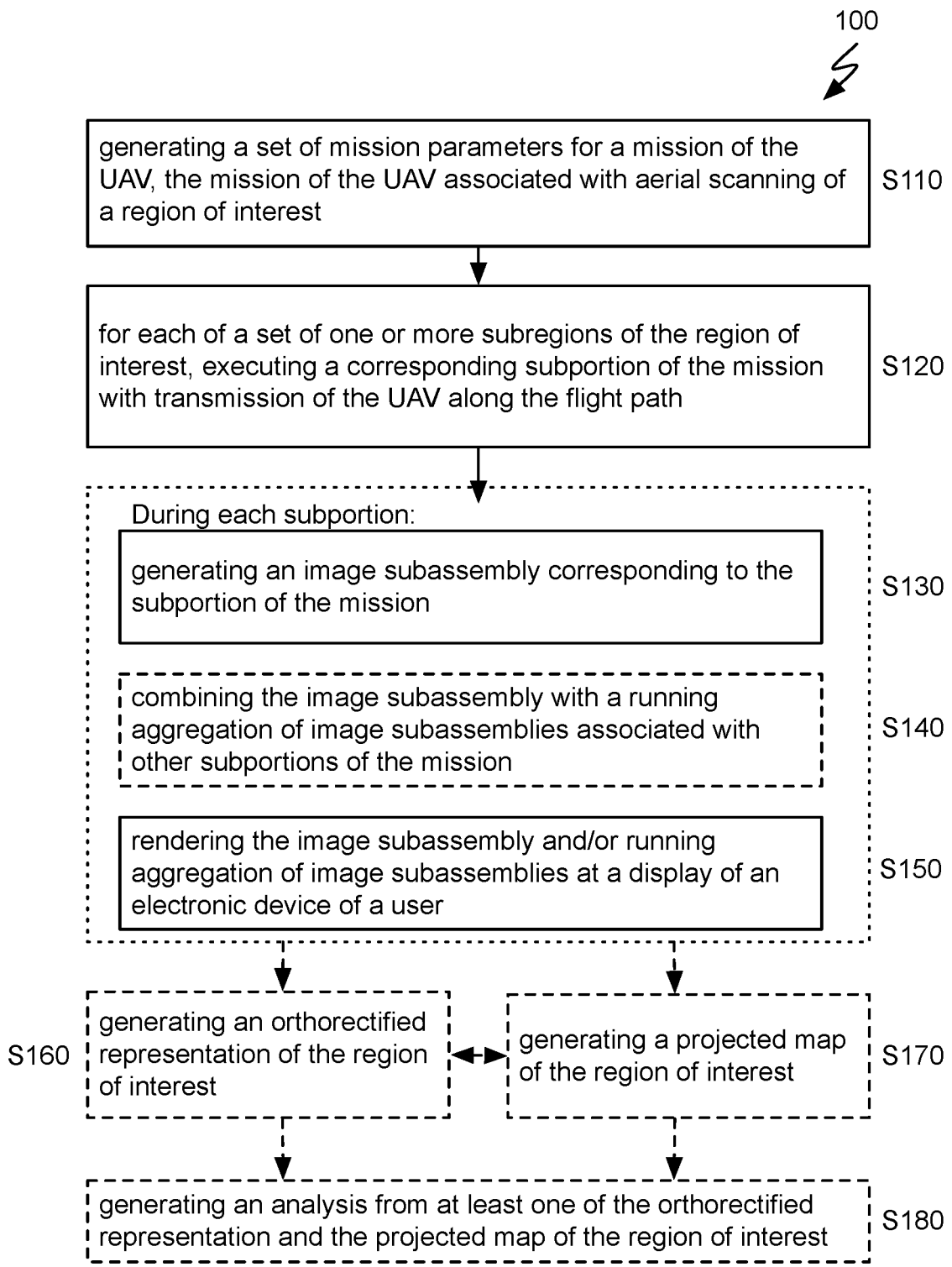
FIG. 1 is a flowchart representation of an embodiment of a method for improved aerial mapping.

As shown in FIG. 1, a method 100 for improved aerial mapping with an unmanned aerial vehicle (UAV) preferably includes: generating a set of mission parameters for a mission of the UAV, the mission of the UAV associated with aerial scanning of a region of interest S110; for each of a set of one or more subregions of the region of interest, executing a corresponding subportion of the mission with transmission of the UAV along the flight path S110 (e.g., wherein the subportion includes a starting phase, an intermediate phase, and a terminating phase); and during each subportion of the mission, generating an image subassembly corresponding to the subportion of the mission S130, combining the image subassembly with a running aggregation of images S140 (e.g., an aggregation of image subassemblies associated with other subportions of the mission), and rendering the image subassembly and/or running aggregation of image subassemblies at a display of an electronic device of a user 150. In some variations, the method 100 can additionally or alternatively include generating an orthorectified representation of the region of interest S160; generating a projected map of the region of interest S110; and/or generating an analysis from at least one of the orthorectified representation and the projected map of the region of interest S180. However, the method 100 can additionally or alternatively include any other suitable elements.

The method 100 can confer several benefits. First, the method can enable orthomosaic and/or point cloud generation using image sets with less frame overlap (e.g., especially side overlap, but additionally or alternatively front overlap) than needed in traditional methods. For example, changes in camera pose between adjacent legs of a boustrophedonic flight path can be robustly determined based on feature matching of temporally-close (e.g., consecutive) frames (and/or on associated telemetry data) and on point cloud generation performed based on such feature matching, rather than relying on feature matching between overlapping regions (e.g., overlapped side regions) of images captured during the adjacent legs. Second, the method can reduce computational processing demands as compared with traditional methods for point cloud generation (e.g., via optimizations such as restricted bundle adjustments and/or compact data representations), thereby enabling rapid (e.g., near real-time) and/or local (e.g., on user devices, such as tablets and/or phones) processing and information output. Such rapid and/or local processing and output can enable rapid user feedback, such as enabling modification of the mission (e.g., based on user requests) while the UAV is still in flight. However, the method can additionally or alternatively provide any other suitable benefits.

The method 100 functions to efficiently generate aerial maps of regions of interest using a single UAV or a fleet of UAVs, and in a manner that accounts for UAV state, environmental aspects, terrain aspects (e.g., homogenous terrain, non-homogenous terrain), and/or any other suitable aspects. The method 100 can additionally or alternatively function to facilitate generation of analyses based upon the aerial maps produced according to the method, wherein, in specific examples, the analyses can provide one or more of: photogrammetric measurements, manipulatable orthomosaic maps, manipulatable models (e.g., 3D models, meshes, point-clouds, etc.), maps or representations annotated/layered with visualizations of custom or known indices (e.g., according to normalized difference Indices, according to enhanced indices, etc.), and any other suitable output.

The method 100 is preferably implemented using a platform interfaced with one or more unmanned aerial vehicles (UAVs) and operable to provide services in relation to one or more of: UAV mission preparation, UAV mission execution, UAV mission modification, aerial image data analysis, aerial video data analysis, analysis of sensor data from aerial systems, aerial telemetry analysis, and/or any other suitable type of UAV-related service. The method(s) 100 can thus be implemented using one or more system elements described in U.S. application. Ser. No. 14/717,955 filed on 20 May 2015 and titled "Method for Adaptive Mission Execution on an Unmanned Aerial Vehicle" and/or U.S. application. Ser. No. 14/844,841 filed on 3 sep. 2015 and titled "System and Methods for Hosting Missions with Unmanned Aerial Vehicles" which are each incorporated in its entirety by this reference. For example, the method 100 can be implemented using one or more UAVs that include system elements such as image sensors (e.g., cameras) and/or spatial sensors (e.g., GPS receivers; inertial measurement units (IMUs), such as gyroscopes, accelerometers, and/or magnetometers; altimeters; etc.). However, the method 100 can additionally or alternatively be implemented using any other suitable system or system elements.

Block S110 recites: generating a set of mission parameters for a mission of the UAV, the mission of the UAV associated with aerial scanning of a region of interest. Block S110 is preferably implemented using a platform interfaced with one or more unmanned aerial vehicles (UAVs) and operable to generate and execute mission plans, and in embodiments, variations, and examples, is implemented using the platform described in U.S. application. Ser. No. 14/717,955 filed on 20 May 2015 and titled "Method for Adaptive Mission Execution on an Unmanned Aerial Vehicle" and/or U.S. application. Ser. No. 14/844,841 filed on 3 sep. 2015 and titled "System and Methods for Hosting Missions with Unmanned Aerial Vehicles".

The region of interest in Block S110 can be a contiguous region of interest, or can alternatively be a non-contiguous region of interest (e.g., a region of interest including non-connected bodies). The region of interest in Block S110 can be user defined (e.g., through an application interface that allows a user to select or otherwise define boundaries of the region of interest). The region of interest in Block S110 can alternatively be defined in any other suitable manner.

Figure 2:
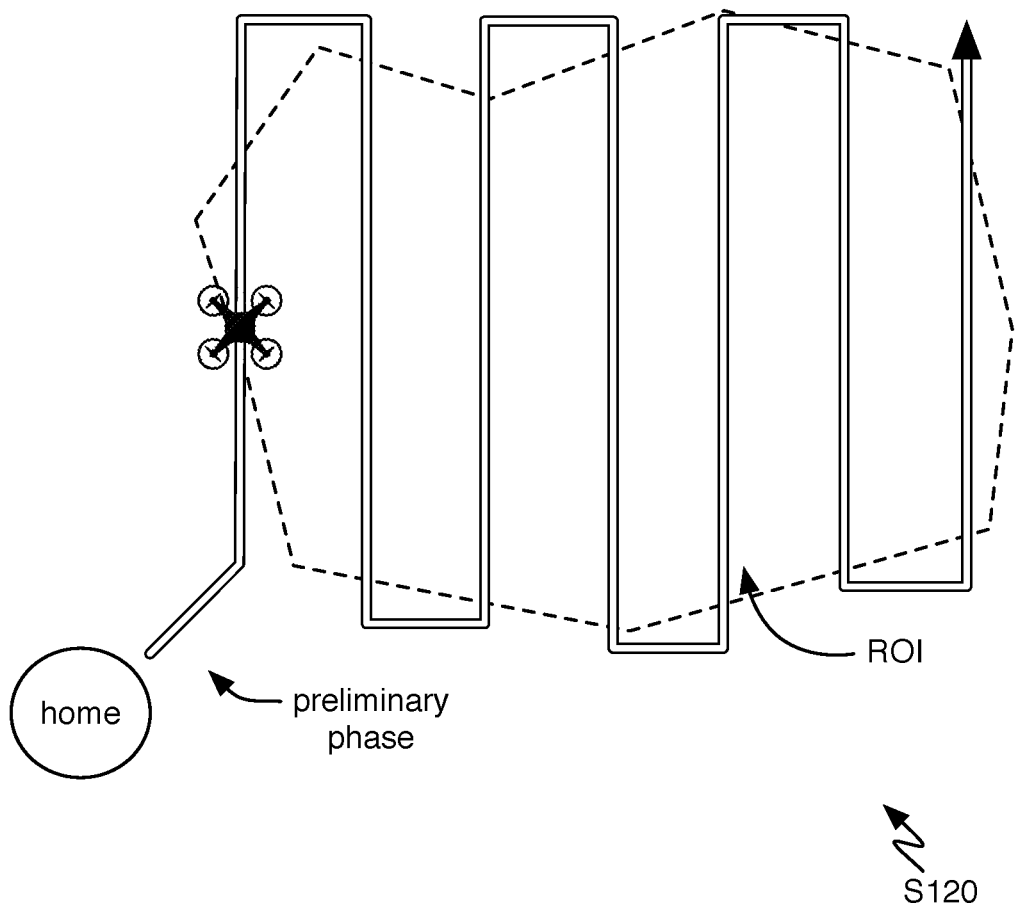
FIG. 2 depicts a variation of a portion of a method for improved aerial mapping.

Block S110 preferably includes identifying one or more flight paths for the UAV that adequately cover the region of interest. The flight path preferably includes desired position nodes of the UAV in association with one or more of time points and/or UAV states (e.g., velocity, acceleration, heading, system states, etc.). The flight path is preferably a flight path that is optimized or otherwise designed around one or more factors including one or more of: factors associated with the region of interest (e.g., distance, altitude, terrain features, wind conditions, pressure conditions, temperature conditions, precipitation conditions, visibility conditions, etc.), factors associated with operation of the UAV system(s) (e.g., battery state, control surface state, powertrain state, electrical system state, housing state, weight, etc.), factors associated with air traffic/air space, and any other suitable factor(s). In one variation, the flight path can be the shortest distance flight path covering the region of interest with appropriate heading and/or altitude changes. In a specific example of this variation, the flight path comprises a serpentine- or boustrophedonic-shaped flight path including approximately straight segments (i.e., segments of constant heading/ground track) separated by transitional segments (e.g., substantially straight transitional segments, rounded segments, etc.) coupling a downstream end of a segment to an upstream end of the following segment (e.g., as shown in FIG. 2); however, the flight path(s) can alternatively be defined in any other suitable manner (e.g., as a spiraling flight path, etc.).

As such, the flight path is preferably generated in consideration of one or more of: altitude considerations, heading considerations, anticipated environmental factors (e.g., winds aloft, temperature, pressure, visibility, moisture, bird activity, etc.) at positions of the UAV along the flight path, takeoff performance, climb performance, descent performance, estimated time enroute considerations, power system requirements and/or power system state, sensor system/camera system requirements (e.g., in terms of environmental conditions) and/or state, control surface state, number of UAVs or other air vehicles associated with the flight path, air traffic considerations, air space considerations, frequency of data collection, frequency of data transfer, weight and balance of the UAV, payload or other weight considerations of the UAV, and any other suitable considerations.

The flight path can be designed or otherwise modified due to changes in conditions, as described in U.S. application. Ser. No. 14/717,955 filed on 20 May 2015 and titled "Method for Adaptive Mission Execution on an Unmanned Aerial Vehicle" and/or U.S. application. Ser. No. 14/844,841 filed on 3 sep. 2015 and titled "System and Methods for Hosting Missions with Unmanned Aerial Vehicles".

Block S120 recites: for each of a set of one or more subregions of the region of interest, executing a corresponding subportion of the mission with transmission of the UAV along the flight path (e.g., wherein the subportion includes an starting phase, an intermediate phase, and a terminating phase). Block S120 functions to execute the mission defined in Block S110, in order to facilitate collection and processing of video data, telemetry data, and/or any other suitable type of data from sensors associated with the UAV.

Each subportion of the mission can include a segment of approximately constant or known conditions (e.g., constant heading conditions, constant ground track conditions, constant altitude conditions, constant orientation conditions, etc.) coupled to an upstream segment by a first transition segment (e.g., associated with one or more heading changes) and coupled to a downstream segment by a second transition segment (e.g., associated with one or more heading changes). Additionally or alternatively, some or all conditions (e.g., heading, ground track, altitude, orientation, etc.) associated with one or more subportions of the mission may be varying and/or unknown. In one embodiment, a mission subportion includes substantially maintaining a constant altitude, pitch, and roll (e.g., at all times, when not performing maneuvers, etc.), such as substantially zero pitch and roll (e.g., relative a gravity vector). In an example of this embodiment, a mission subportion (e.g., the only subportion of the mission) includes following a predefined ground track (e.g., enabling imaging of an entire region of interest, preferably while achieving a predetermined front and/or side overlap between images), such as a boustrophedonic or spiral ground track, while maintaining a substantially constant altitude and, when not turning and/or compensating for changes in external forces, such as wind gusts, maintaining a substantially constant pitch and roll. However, the mission subportion(s) can additionally or alternatively include any other suitable segments.

Each subportion of the mission preferably includes collection, storage, and/or transmission of both telemetry data and video data from the UAV for downstream processing in relation to generation of one or more aerial maps as facilitated by subsequent blocks of the method 100. In variations, Block S110 thus comprises real-time and/or near real time transmission of telemetry data (e.g., GPS data, IMU data, etc.) from the UAV and video data captured using the UAV to associated computing systems for processing. Each subportion of the mission can additionally or alternatively include collection, storage, and/or transmission of any other suitable type of data. Data can be collected and/or transmitted at any suitable rate (e.g., from 5-50,000 Hz). Block S110 preferably further includes registering (e.g., registering in time) the telemetry dataset and the video dataset from the UAV, in order to facilitate downstream processing steps.

Each subportion of the mission can additionally or alternatively include one or more of: an acceleration phase, an intermediate phase, and a deceleration phase. The acceleration phase can be associated with acceleration of the UAV from a low-velocity state (e.g. upon exiting a previous subportion of the mission) to a desired velocity associated with the intermediate phase, the intermediate phase can be associated with cruise settings of the UAV along a majority of the subportion of the mission, and the deceleration phase can be associated with deceleration of the UAV from the intermediate phase to a low velocity state associated with transitioning into the next subportion of the mission. One or more subportions of the mission can additionally or alternatively include one or more of a climbing phase, a descending phase, a cruise phase, an upwind phase, a downwind phase, a crosswind phase, and/or any other suitable phase.

In some variations, Block S120 can include a preliminary phase, prior to execution of the first subportion of the mission, the preliminary phase including transmission of the UAV from a home position to an initiating position of the first subportion of the mission defined in Block S110. Block S120 can additionally or alternatively include execution of a pre-flight mission according to one or more methods described in U.S. application. Ser. No. 14/717,955 filed on 20 May 2015 and titled "Method for Adaptive Mission Execution on an Unmanned Aerial Vehicle" and/or U.S. application. Ser. No. 14/844,841 filed on 3 Sep. 2015 and titled "System and Methods for Hosting Missions with Unmanned Aerial Vehicles".

In a specific example, each subportion of the mission covers an approximately rectangular strip of the region of interest, such that, collectively, the subportions cover approximately parallel subportions of the region of interest. In the example, adjacent strips associated with each subportion of the mission are preferably overlapping (in relation to downstream Blocks of the method 100 associated with assembly of the strips into a representation of the region of interest). Alternatively, adjacent strips associated with each subportion of the mission can be non-overlapping (e.g., directly abutting, including coverage gaps between the strips, etc.). As such, in a first approach, each frame is added to a strip, and then strips are assembled to form a mosaic (e.g., wherein the first strip formed becomes the base of the mosaic, and subsequent strips are added to the mosaic). In an alternative second approach (e.g., in which the mission includes only a single subportion, in which the mission subportions are associated with non-contiguous or non-overlapping regions, etc.), each incoming frame can be directly added to a base mosaic (without requiring assembly of strips assembled from frames of data). As such, some variations of the method 100 can omit portions of Block S130 and/or S140, in relation to generating subassemblies from frames of incoming data. In an alternative third approach, mosaic assembly can be performed by assembling a mix of incoming frames and strips of assembled frames. As such, assembly of a final mosaic can be performed using a combination of techniques and/or in any other suitable manner.

Block S130 recites: during each subportion of the mission, generating an image subassembly corresponding to the subportion of the mission. Block S130 functions to generate (e.g., iteratively generate) subportions of a complete representation (e.g., orthomosaic map), preferably including monitoring of UAV state/data quality and/or pre-processing steps that can facilitate rapid assembly of data from the UAV into a complete representation of the region of interest. The image subassemblies can be approximately rectangular (e.g., as in rectangular strips), or can have any other suitable morphology, depending upon the flight path of the UAV, camera parameters, and/or any other suitable parameters.

Block S130 preferably implements a subassembly generation algorithm that processes incoming frames of data (e.g., image data, telemetry data, etc.) from the UAV with one or more filtering algorithms associated with UAV state and data quality state.

Figure 3:
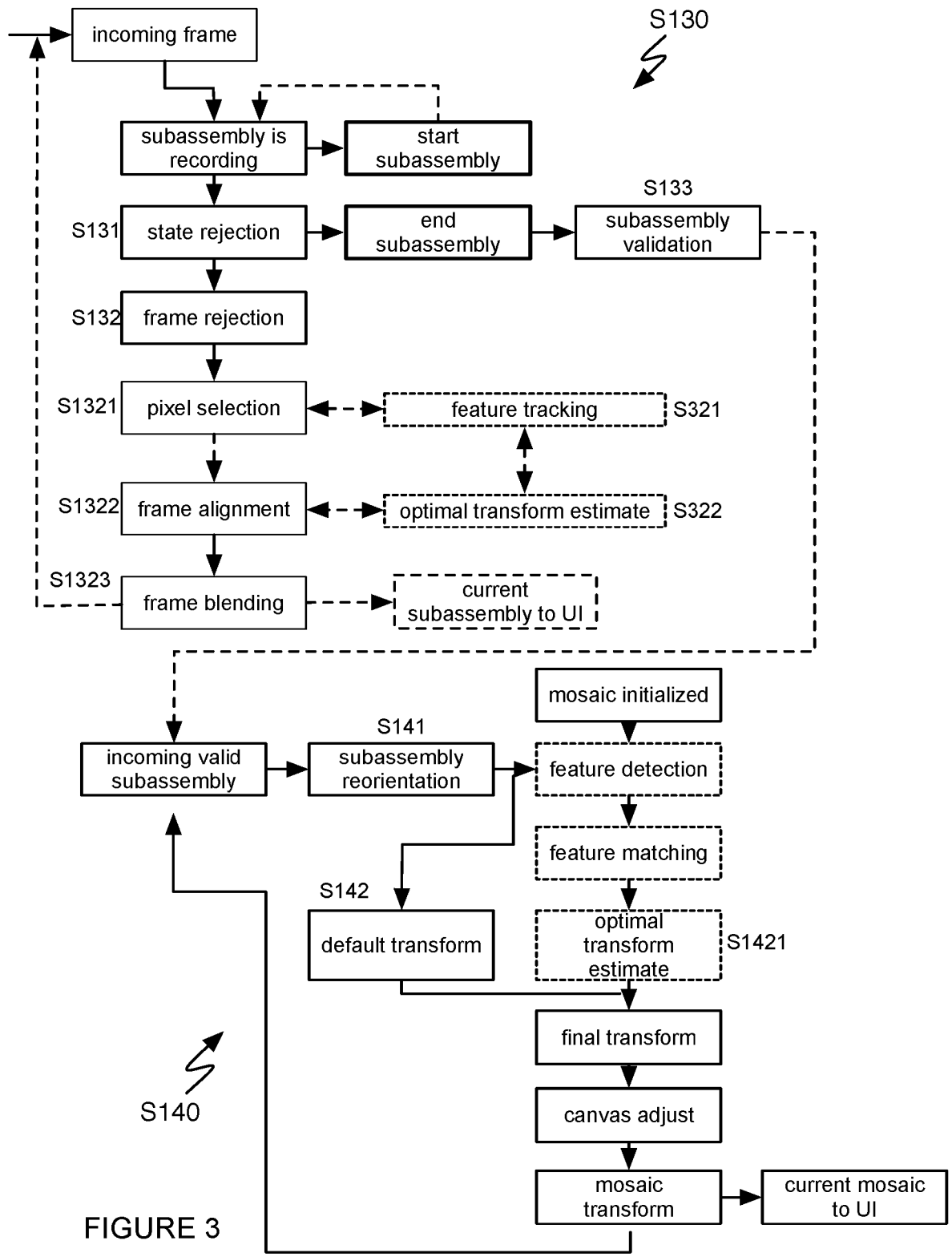
FIG. 3 is a flowchart representation of a variation of an embodiment of a method for improved aerial mapping.

In one variation, as shown in FIG. 3, Block S130 can include one or more of: determining if the frame is associated with the starting phase, the intermediate phase, or a terminating phase of a subportion of the mission based upon a state rejection filter S131, and/or implementing a frame rejection filter S132 (e.g., before, after, and/or concurrent with S131). Outputs of processing according to S131 and/or S132 can produce an image subassembly associated with the corresponding subportion of the mission of the UAV. Outputs of Block S132 can then be passed through a subassembly validation step S133 configured for performing a final check of an assembled subassembly, outputs of which are passed to Block S140 for combining a validated subassembly with a running aggregation of image sub-assemblies.

In an example, Block S131 includes passing an incoming frame through a module that determines if a subassembly is currently being recorded. Upon determination that a subassembly is not being recorded, the module then initiates recording of a new subassembly. However, upon determination that a subassembly is being recorded, the module continues recording according to the state rejection filter of Block S131, until recording of the subassembly is complete. In one variation, Block S131 can include determining if pixels of an incoming frame correspond with the starting phase, the intermediate phase, or the terminating phase of a mission subportion, based upon features extracted from the telemetry dataset (e.g., based upon UAV heading state, based upon UAV position state, based upon other UAV state, etc.). For instance, upon receiving an incoming frame from the UAV, Block S131 can comprise extracting a heading of the UAV from the telemetry dataset, and if the heading is associated with a intermediate phase of a subportion of the mission, initiation of recording of a new subassembly will not occur. Similarly, upon receiving an incoming frame from the UAV, Block S131 can comprise extracting a heading of the UAV from the telemetry dataset, and if the heading is associated with a transitional phase of a subportion of the mission, initiation of recording of a new subassembly will occur. However, Block S131 can additionally or alternatively be implemented in any other suitable manner (or Block S131 can alternatively be omitted).

Figure 4:
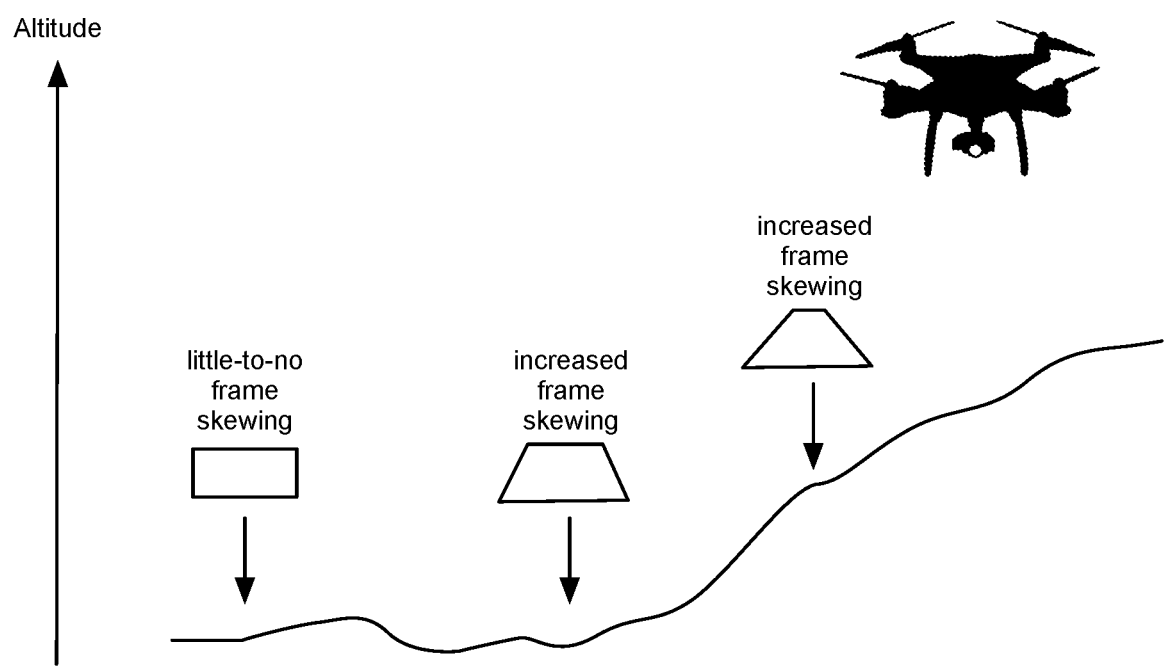
FIG. 4 is a schematic of an example of a portion of a method for improved aerial mapping.

In addition to heading of the UAV, the state rejection filter of Block S131 can additionally or alternatively process position in relation to terrain, as shown in FIG. 4, in order to facilitate related frame processing steps (e.g., pixel selection, frame alignment, frame skewing, etc.). In more detail, absolute altitude above specific terrain features (e.g., falling terrain, rising terrain) can produce image frames that require additional frame processing steps, so that the frame can be blended appropriately with adjacent frames. Thus, implementation of the state rejection filter of Block S131 can include identifying position of the UAV relative to specific terrain features, in order to guide subsequent frame processing steps associated with pixel selection, frame alignment, frame blending, and/or any other suitable aspect of generating the subassembly from frames.

Additionally or alternatively, the state rejection filter of Block S131 can perform an assessment of one or more orientations of the UAV, in relation to one or more of pitch, roll, and yaw, in order to guide subsequent frame processing steps associated with pixel selection, frame alignment, frame blending, and/or any other suitable aspect of generating the subassembly from frames. Additionally or alternatively, the state rejection filter of Block S131 can perform an assessment of one or more of: UAV video and/or image feed states (e.g., in relation to image artifacts, image discoloration, image blur, compression artifacts, etc.), UAV energy management system states, UAV powertrain system states, states of sensors of the UAV, states of instruments of the UAV, states of control surfaces of the UAV, states of the environment and/or climate (e.g., in terms of visibility, moisture, winds, temperature, pressure, environmental lighting, etc.), and any other suitable states.

The frame rejection filter of Block S132 determines if a frame should be incorporated into the subassembly, or if further processing of the frame into the subassembly should not occur, and instead, a new incoming frame should be processed. In an example, as shown in FIG. 3 implementing the frame rejection filter of Block S132 can include a pixel selection operation S1321, a frame alignment operation S1322, and a frame blending operation S1323. Block S132 can additionally or alternatively include a frame corruption check operation and/or a frame preprocessing operation. Block S132 can, however, additionally or alternatively include any other suitable operations to determine if a frame has suitable quality for blending into a current subassembly.

The frame corruption check operation functions to determine whether data associated with the frame is corrupted (wherein corrupted frames are preferably ignored and/or discarded). The corruption check is preferably performed before any other frame processing and/or analysis, but can additionally or alternatively be performed at any other suitable time. The corruption check can include, for example, examining data headers (e.g., to determine conformance to header standards, wherein lack of conformance can indicate corruption), calculating hashes, and/or examining checksums (e.g., wherein a calculated hash value or checksum value not equal to an expected value can indicate corruption). For example, the image data can include an H264 video stream, and the frame corruption check operation can include examining the checksum of a raw H264 frame of the stream. However, the frame corruption check operation can additionally or alternatively be performed in any other suitable manner.

The frame preprocessing operation preferably functions to prepare a frame for analysis, modification, and/or storage (e.g., for subsequent operations of Block S132). The frame preprocessing operation can include one or more of: decoding and/or decompressing the frame, converting the frame to greyscale, downsampling the frame, and blurring the frame. The frame is preferably stored in (and/or converted to) a luma-based (or luminance-based) color space (e.g., YUV color space), such that the luma channel can be used directly (e.g., obviating the need for conversion to greyscale). In one example, downsampling and/or blurring (e.g., performing a Gaussian blur operation) can be performed using optimized hardware vector operations, such as an ARM NEON routine. However, the frame preprocessing operation can additionally or alternatively include any other operations performed in any suitable manner.

The pixel selection operation of Block S1321 functions to select a reduced or minimized number of pixels from the incoming frame, in order to reduce processing load for downstream blocks of the method 100. The pixel selection operation can implement an algorithm in computer code operable to identify regions of pixels associated with inappropriate position and/or velocity parameters of the UAV (e.g., pixels at the edge of a frame) that do not need to be processed in downstream steps (e.g., in a pixel filtering operation), and passes references to selected pixels (e.g., indices of selected pixels, regions of selected pixels, etc.) to subsequent blocks of the method 100. Selected pixels can include pixels to be analyzed (e.g., for feature tracking), pixels to be blended into the subassembly, and/or any other suitable pixels. In one embodiment, Block S1321 includes selecting and/or assessing bands of pixels (e.g., horizontal bands, such as bands substantially normal an aircraft velocity vector at the time of image capture). For example, Block S1321 can include (e.g., after the feature extraction operation of Block S321) determining a quality metric for each band of a frame, such as based on statistical metrics associated with the extracted features (and/or scores associated with the features, such as corner scores) and/or the pixel values, wherein only bands above a threshold quality metric are selected. Block S1321 can thus omit unnecessary pixels from further processing. However, Block S1321 can additionally or alternatively be performed in any other suitable manner, or can alternatively be omitted.

The frame alignment operation of Block S1322 functions to perform a combination operation with pixels from multiple incoming frames, wherein the combination operation includes one or more of stacking and blending of pixels from multiple frames. The frame alignment operation of Block S1322 can additionally or alternatively include operations associated with skewing (e.g., transforming a rectangular array of pixels into a trapezoidal array, transforming an array of pixels into an array of another shape, etc.) of frames (and/or subsets thereof) in relation to the state rejection filter of Block S131. For instance, in relation to processing a frame associated with rising terrain, the frame alignment operation of Block S1322 can transform the rectangular array of pixels into a skewed array of pixels in order to facilitate blending of the frame into the image subassembly.

Block S1321 and S1322 can be implemented in any suitable order. For instance, pixel selection can be performed prior to alignment, or alignment can be performed prior to pixel selection. Furthermore, Blocks S1321 and S1322 can be implemented in coordination with one or more computer vision techniques including feature tracking techniques S321 and/or optimal transform estimate techniques S322. As shown in FIG. 3, outputs of the pixel selection operation can be provided to a computer vision module operable to perform feature tracking operations on pixels, in order to track features of interest from each incoming frame to facilitate assembly of the incoming frames. The feature tracking operation of Block S321 can include one or more of edge detection, corner detection, blob detection, ridge detection, and any other feature detection process, which in specific examples can include or be derived from one or more of: a Canny approach, a Sobel approach, a Kayyali approach, a Harris & Stephens/Plessey/Shi-Tomasi approach, a SUSAN approach, a level curve curvature approach, a FAST approach, a Laplacian of Gaussian approach, an MSER approach, a PCBR approach, and any other suitable approach.

Block S321 can include a feature extraction operation and/or a feature matching operation. The feature extraction operation preferably functions to determine (e.g., using techniques such as those described above) a set of features (e.g., corners, edges, blobs, ridges, features corresponding to physical features of the imaged region, etc.), each feature associated with a different subset of the frame ("photo subset"). The photo subset can be a set of pixels, an image region, a contiguous photo subset, and/or any other suitable subset of the frame. Each feature extracted is preferably of the same feature type (e.g., all corners, all blobs, etc.), but the set of features can alternatively include features of multiple types. However, the feature extraction operation can additionally or alternatively be performed in any other suitable manner to determine any suitable number and/or type of features.

In one embodiment, the feature extraction operation includes subdividing the frame into multiple segments and extracting features from each segment. Features can then be extracted from each segment of the frame (e.g., extracting an equal or similar number of features from each segment, extracting features in numbers substantially proportional to segment area, etc.). Such subdivision can function to achieve a more even distribution of features across the frame. Preferably, the segments are non-overlapping and cooperatively span the frame, such as defining a grid (e.g., rectangular grid of equivalently-shaped segments) covering the frame, but can alternatively exclude any suitable frame regions and/or overlap in any suitable manner. For example, the feature extraction operation can include: segmenting the frame into a set of photo segments cooperatively defining a grid; determining a target feature number; and for each photo segment of the set, determining a respective subset of features consisting essentially of a number of features equal to the target feature number, wherein each feature of the subset is depicted by the photo segment (e.g., wherein the set of features consists essentially of the respective subset of features of each photo segment).

The feature matching operation preferably functions to determine matches between features extracted from different frames (e.g., using the techniques described above and/or any other suitable techniques). The feature matching operation can include determining (e.g., for some or all of the features of the set extracted from a particular frame) matches with features extracted from other frames (e.g., previously captured and/or processed frames). Determining such matches preferably includes determining the associated photo subset of each frame that depicts the feature, wherein a match indicates that the photo subsets are believed to depict the same physical feature in the imaged region. The feature matching operation can optionally include eliminating outlier matches, such as by a random sample consensus (RANSAC) process.

The extracted and/or matched feature information determined in Block S321 can be used in Block S1321, in Block S322, in Block S1322, and/or in any other suitable operations of the method. For example, the matched sets of features can be output to the optimal transform estimate operation for use as described below.

Also shown in FIG. 3, an optimal transform estimate operation S322 can implement computer vision techniques (e.g., for determining feature locations within the region, for transforming an incoming frame into a skewed and/or otherwise transformed frame, etc.). Block S322 can include, for example, one or more of: a triangulation operation, a bundle adjustment operation, and a transform optimization operation.

Figure 6:
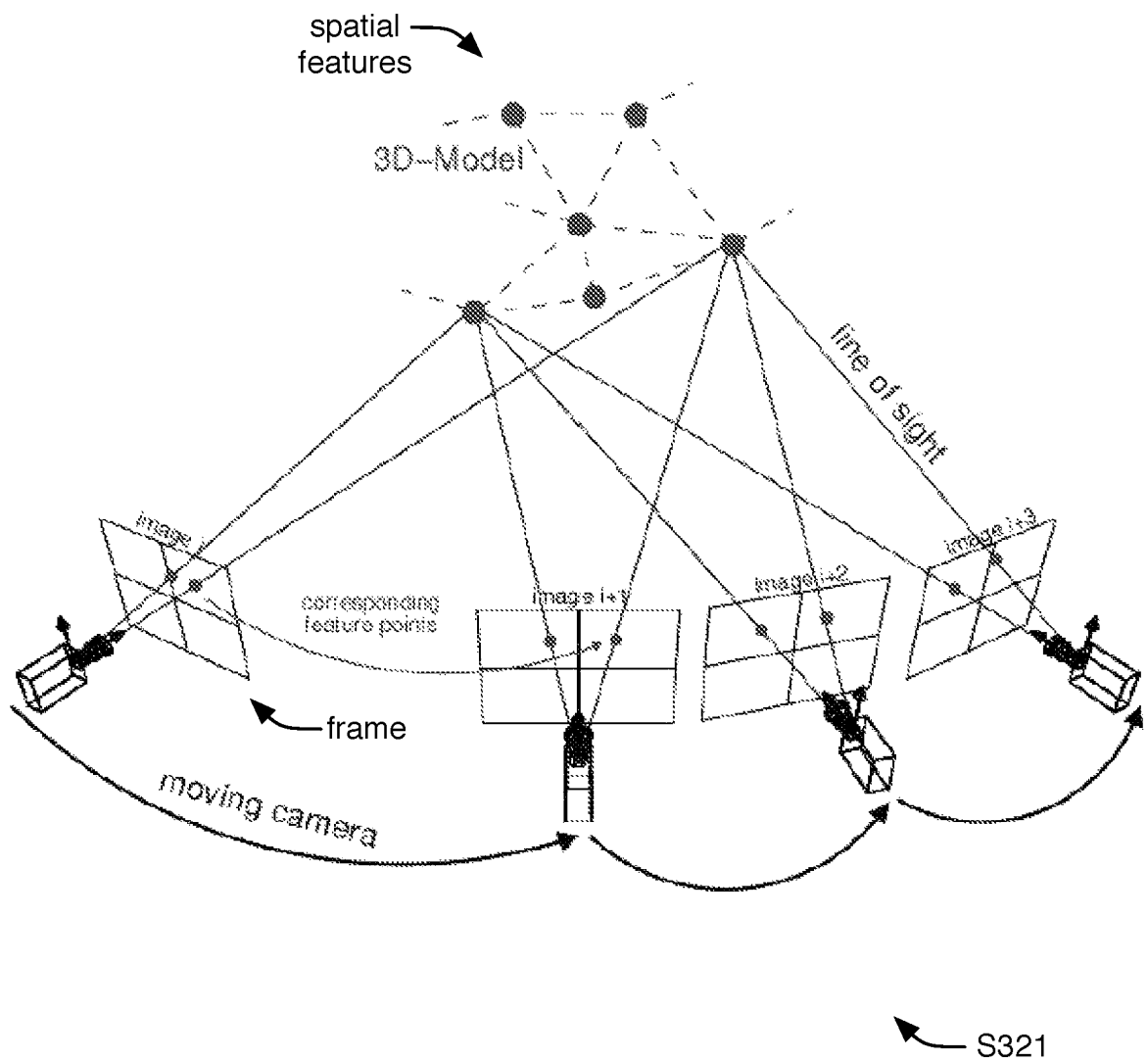
FIG. 6 depicts a schematic representation of a feature tracking process.

The triangulation operation preferably functions to estimate the positions of the physical features (e.g., extracted and matched features) within the region, such as by back-projecting matched features into 3D space to determine an associated physical feature position in 3D space (e.g., as shown in FIG. 6). For example, the triangulation operation can include, for each matched feature (e.g., from Block S321), determining a position including a three-dimensional coordinate set representative of a location within the imaged region (e.g., a latitude, longitude, and altitude; a set of displacement coordinates relative to a reference location, such as a location within the region; etc.). The triangulation operation preferably uses data indicative of camera position and/or orientation (e.g., telemetry data, such as UAV GPS and/or IMU data) to determine (e.g., estimate) the camera pose (position and orientation) for triangulation, but can additionally or alternatively determine the camera pose in any other suitable manner.

The bundle adjustment operation preferably functions to refine the estimates of the triangulation operation, such as by minimizing the reprojection error associated with the determined physical feature positions. The bundle adjustment operation can include optimizing (e.g., to minimize the reprojection error) over one or more of: camera intrinsics parameters (e.g., focal length, lens distortion coefficients, etc.), camera extrinsics parameters (e.g., position, orientation), and physical feature positions. The bundle adjustment is preferably performed for each new frame, but can alternatively be performed for only a subset thereof, or be performed any other suitable number of times. However, the method can alternatively omit the bundle adjustment operation (e.g., wherein subsequent operations, such as the transform optimization operation, rely instead on the estimated spatial feature positions determined by the triangulation operation and/or the camera poses determined based on telemetry data).

Optimization over some or all parameters during bundle adjustment can optionally be restricted (e.g., to reduce processing requirements). Optimization restrictions can include fixing parameters at specific values and/or constraining parameters to remain within a specific range of values. Such restrictions are preferably imposed on camera pose parameters, more preferably altitude, pitch, and/or roll. However, restrictions can additionally or alternatively be imposed upon other pose parameters, such as forward motion (e.g., motion along a planned heading or ground track), lateral motion (e.g., motion normal the planned heading or ground track), and/or yaw, and/or can be imposed on any other suitable parameters. In a first variation, the altitude, pitch, and roll of each camera pose are fixed at specific values during bundle adjustment. In a first example of this variation, the values are equal for each frame (constant altitude, pitch, and roll), corresponding to a planar constraint. In a second example, the altitude, pitch, and roll of each camera pose are fixed at values corresponding to the telemetry data collected at (or near) that pose. In a second variation, the altitude, pitch, and roll of each camera pose are constrained within a range around the initial estimated values (e.g., values used in the triangulation process). For example, each altitude value can be constrained within a threshold distance (e.g., 0.1 m, 0.25 m, 0.5 m, 1 m, 2 m, 3 m, 5 m, 10 m, etc.) of the corresponding initial estimate, and each pitch and roll value can be constrained within a threshold angular distance (e.g., 1°, 3°, 5°, 10°, 15°, 20°, 30°, etc.) of the corresponding initial estimate. In a third variation, a subset of bundle adjustments (e.g., one out of each set of consecutive frames and/or bundle adjustments, such as one out of every 3, 5, 7, 10, 25, 100, 2-10, 10-30, or 30-100 frames) are performed without optimization restrictions (or with fewer restrictions, such as using constrained ranges rather than fixed values), and the values determined in the unoptimized bundle adjustments are used for the restricted bundle adjustments of nearby frames. In one example, an unrestricted bundle adjustment is performed once every 7 frames, and the following bundle adjustments (corresponding to the following 6 frames) are performed fixing the altitude, pitch, and roll based on the values determined in the unrestricted bundle adjustment (e.g., set equal to the determined values, extrapolated based on changes in the determined values, etc.). However, the optimizations can additionally or alternatively be constrained in any other suitable manner, or can alternatively be unconstrained.

The data used for each iteration of bundle adjustment can optionally be restricted. In some embodiments, each bundle adjustment process (e.g., corresponding to each processed frame) can be performed based on a limited number of frames (e.g., limited to 3, 5, 7, 10, 15, 25, 2-20, or 20-200 frames, in addition to or including the current frame), which can function to reduce processing requirements and maintain substantially constant processing requirements throughout performance of the method (e.g., despite increasing numbers of collected and/or processed frames). In a first example, the frames used for the bundle adjustment are restricted based on a temporal window (e.g., selecting the most recently captured and/or processed frames). In a second example, frames are restricted based on a spatial window (e.g., frames with the closest camera positions, the most overlapped view regions, and/or the greatest number of matched features). In a third example, a random subset of frames (e.g., of all captured and/or processed frames, of frames with overlapping view regions and/or matched features, etc.) is used. However, frame usage can additionally or alternatively be limited in any other suitable manner, or can alternatively be unlimited.

The transform optimization operation preferably functions to determine optimized transforms to apply to the frames (or portions thereof), such as by rectifying (e.g., orthorectifying) the frames, thereby enabling the frames to be blended (e.g., to generate an orthomosaic map). The transform optimization operation is preferably performed based on the spatial feature positions and/or camera poses determined previously (e.g., determined by the bundle adjustment operations and/or the triangulation operations), but can additionally or alternatively be performed based on any other suitable information.

In one specific example, Block S322 can estimate optimal frame alignment and/or transformation (e.g., affine transformation) as a correction to a telemetry-based approach for frame alignment, but if the computer vision approach(es) fail(s), the telemetry-based approach would be implemented as an un-optimized default (e.g., in relation to processing data associated with homogenous terrain or constantly changing terrain, such as a body of water). However, computer vision techniques can additionally or alternatively be implemented in coordination with telemetry-based approaches for omitting pixels from frames and/or aligning frames.

The frame blending operation of Block S1323 functions to blend a processed incoming frame into a running aggregation of assembled frames (e.g., in order to create the image subassembly associated with a subportion of a mission, in order to create a running aggregation of all processed images of the mission, etc.). The frame blending operation can implement any one or more of: seam reduction algorithms (e.g. using gain adjustment approaches proximal to the seam), algorithms to mitigate parallax, algorithms to mitigate distortion effects (e.g., due to the camera lens, due to rolling shutter effects, etc.), algorithms to mitigate exposure/lighting effects (e.g., in relation to environmental lighting changes), and any other suitable algorithms.

The frame blending operation can include generating a blended image and/or image pyramid (e.g., Laplacian pyramid, Gaussian pyramid, steerable pyramid, etc.). The blending weights can optionally be represented as (e.g., stored as, computed as, etc.) integer values (e.g., 8 bit integers, 16 bit integers, etc.), which can reduce storage, memory, and/or processing requirements as compared with using floating point representations (e.g., 32 bit floats, 64 bit doubles, etc.), but can additionally or alternatively be represented using floating point representations and/or any other suitable representations. The pyramid levels (e.g., of a Laplacian image pyramid) can be represented as compressed low-precision integers (e.g., signed 8 bit integers), which can reduce requirements as compared with using higher-precision representations (e.g., signed 16 bit integers), but can additionally or alternatively be represented using higher-precision representations and/or any other suitable representations.

Further optimizations (e.g., reducing processing and/or storage usage) can optionally be employed regarding storage and/or output of the generated images and/or image pyramid. For example, an image (e.g., pyramid tile, blended image subset, etc.) can optionally be stored (e.g., uncompressed, lightly compressed, etc.) in memory until after a threshold time has elapsed without the image being modified (e.g., by subsequent bundle adjustment, transform, and/or blending operations), after which the image can be compressed (e.g., converted to a PNG representation). Additionally or alternatively, the image (e.g., uncompressed, lightly compressed, finally compressed such as PNG, etc.) can be retained in memory (e.g., and not written to long-term storage) until after a second threshold time (e.g., longer than the first threshold time for image compression) has elapsed without the image being modified, after which the image can be written to long term storage. However, the frame blending operation can additionally or alternatively employ any other suitable optimizations, and/or can be performed in any other suitable manner.

Block S140 recites: during each subportion of the mission, combining the image subassembly with a running aggregation of image subassemblies associated with other subportions of the mission. Block S140 functions to process incoming subassemblies from Block S130 and to blend them with a running aggregation of image assemblies, but, as indicated above, can alternatively be substituted with blocks of steps associated with addition of incoming frames to a base mosaic (without aggregation of strips or other image assemblies). As such, a subassembly can include any suitable number of frames. Block S140 preferably includes blocks associated with subassembly re orientation, subassembly transformation, subassembly blending with the running aggregation (i.e., an orthomosaic or an orthomosaic-in-progress), canvas adjustment, and any other suitable step. The running aggregation is preferably represented as one or more blended images and/or image pyramids, such as an image pyramid generated from the blended images and/or image pyramids generated in Block S1323, but can additionally or alternatively be represented in any other suitable manner.

In one variation, as shown in FIG. 3, Block S140 can include Block S141, which recites: re-orienting an incoming subassembly, if needed, to match the orientation of the running aggregation of subassemblies. In the example involving a serpentine or boustrophedonic flight path, Block S141 can include rotating, by heading, alternating incoming subassemblies (e.g., rotating by approximately 180°). However, depending upon the flight path, subassemblies can alternatively be rotated by any suitable number of degrees to align the orientations of all of the incoming subassemblies.

As shown in FIG. 3, Block S140 can additionally or alternatively include Block S142, which recites: performing a transformation operation on the incoming subassembly. Similar to the pixel selection and frame alignment operation described in relation to Blocks S131-S132, the transformation operation 142 can be implemented without computer vision techniques, or can alternatively be implemented using one or more computer vision techniques. In one variation, Block S142 can include an optimal transform estimate operation S1421, which processes feature detection inputs and performs feature mapping of features across different subassemblies, in order to perform the optimal transform estimate operation. In a specific example, Block S1421 can compute an optimal affine transformation between multiple point sets (e.g., two 2D point sets, any suitable number of point sets in any number of dimensions). Similar to Blocks S131-S132, if the computer vision enhanced operations fail, Block S142 can include defaulting to translating pixels of an incoming subassembly based on known position differences between adjacent subassemblies (e.g., differences in latitude, difference in longitude).

Finally, this variation of Block S140 can include adjusting an image canvas associated with the running aggregation of image subassemblies, with the transformed version of the incoming subassembly, and then performing a transformation of the running aggregation, if needed. Alternatively (e.g., in embodiments in which the mission includes only a single subportion), any or all elements of Block S140 can optionally be omitted.

Block S150 recites: during each subportion of the mission, rendering a representation of a running aggregation of data associated with the mission. The data representation can include: the image subassembly and/or the running aggregation of image subassemblies; a point cloud (e.g., 2D point cloud, 3D point cloud, etc.), such as a point cloud associated with the spatial feature positions; a projected map (e.g., such as projected maps described below regarding Block S170); and/or any other suitable representation.

The representation is preferably rendered at a display of an electronic device of a user, but can additionally or alternatively be rendered at any other suitable display element. Block S150 functions to update a rendering of the region of interest, in progress, to a user (e.g., in near-real time; within a threshold time after image capture, such as within 0.1 s, 0.3 s, 1 s, 2 s, 3 s, 5 s, 10 s, 155, 20 s, 30 s, 60 s, 0.1-1 s, 1-10 s, 10-100 s, etc.), such that the user can monitor progress of scanning of the region of interest. As such, in relation to U.S. application. Ser. No. 14/717,955 titled "Method for Adaptive Mission Execution on an Unmanned Aerial Vehicle", which is incorporated by this reference, the method 100 can be used to adjust mission parameters or a path of the UAV(s) involved (e.g., after a high-level or low-level quality scan of the region of interest has been conducted). Furthermore, such information can be used to drive movement and capturing of lower-altitude and/or higher quality image representations of certain areas of interest associated with the region of interest (e.g., based on detected features of the region of interest, user inputs, etc.).

For example, in response to receiving a refinement request (e.g., associated with a subset of the region of interest) from the user, the method can include: modifying the mission parameters based on the request; capturing additional image frames (e.g., associated with the subregion); processing the image frames (e.g., as described above, such as regarding Blocks S130 and/or S140); and displaying the updated rendering at the electronic device. The refinement request can include a user selection of a subset of the region of interest, a user indication of a poorly- and/or inadequately-imaged portion of the region of interest, a user selection of a "refine region" button, and/or any other suitable user input or other request. Modifying the mission parameters preferably functions to control the UAV (and/or a different UAV) to fly over the subregion to be refined (e.g., in a boustrophedonic or spiral pattern), such as at a lower altitude, slower velocity, and/or different heading (e.g., substantially perpendicular the original heading) as compared with an already-performed portion of the mission (e.g., earlier UAV flyover of the subregion). This can enable re-imaging of the subregion, preferably with higher quality than the initial imaging. However, user inputs can additionally or alternatively be treated in any other suitable manner.

Figure 5:
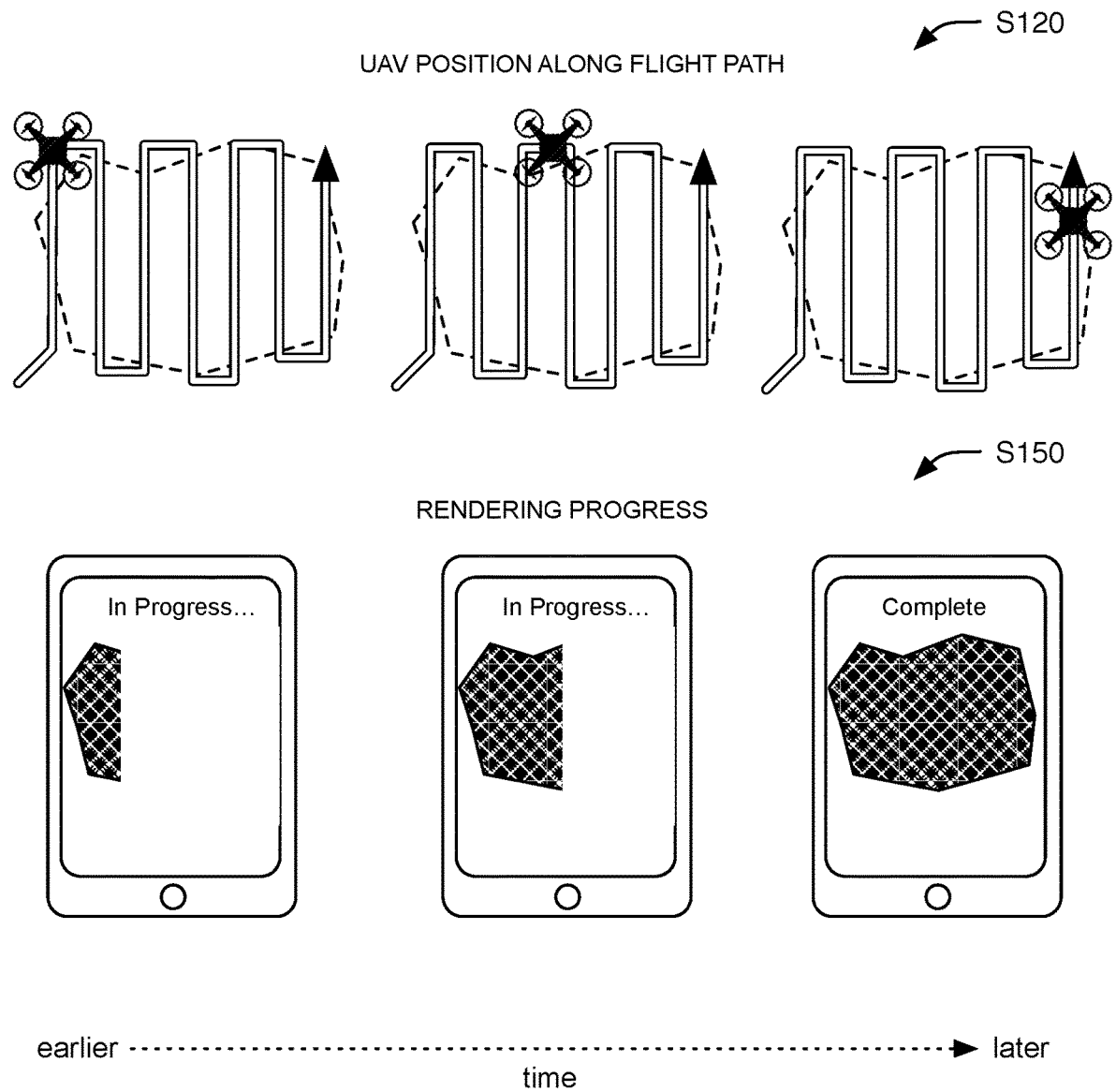
FIG. 5 depicts an example application of a portion of a method for improved aerial mapping.

In variations, Block S150 can include rendering the running aggregation at one or more of: a mobile computing device, a personal computing device, and/or a wearable computing device (e.g., head-mounted wearable computing device, forearm-borne mobile computing device, etc.) of the user. In variations, Block S150 can additionally or alternatively include rendering the running aggregation at multiple devices of the same user or different users. In a specific example, shown in FIG. 5, Block S150 includes rendering the running aggregation within an application executing at a mobile computing device (e.g., tablet, mobile phone, etc.; preferably the device performing Blocks S130 and/or S140 but additionally or alternatively any other suitable devices) of the user, wherein the mobile computing device is coupled (e.g., by WiFi, by another wireless communication protocol) to the UAV performing the scanning. Block S150 is preferably performed using the blended image(s) and/or image pyramid(s) generated as described above (e.g., regarding Block S130 and/or S140), such as by displaying image tiles of the image pyramid. However, Block S150 can additionally or alternatively be implemented in any other suitable manner.

As noted above, the method 100 can additionally or alternatively include generating an orthorectified representation of the region of interest S160 and/or generating a projected map of the region of interest S110. The orthorectified representation can be a processed version of the final iteration of subassembly generation from Blocks S130 and/or S140, or can alternatively be generated in any other suitable manner. Furthermore, the projected map of the region of interest can include one or more of: an elevation map (e.g., 2.5D representation, topographic map, etc.), a terrain model, a 3D model, a point cloud (e.g., 3D point cloud, 2D point cloud, etc.), and any other suitable multi-dimensional representation.

The orthorectified representation and/or projected map are preferably generated based on the information sampled and/or determined in the method (e.g., during any or all of Blocks S120-S150), such as based on the spatial feature positions, camera poses, telemetry data, and/or images (e.g., captured image frames, orthorectified images, etc.). The orthorectified representation and/or projected map can be generated by the same device(s) that perform any or all of Blocks S120-S150, generated by different devices (e.g., by a remote computing system, such as an internet-connected server), and/or generated in any other suitable manner. In one example, information determined in Blocks S120-S150, such as the spatial feature positions, camera poses, telemetry data, and/or images, is transmitted to a remote computing system, which generates an orthorectified representation (e.g., of greater accuracy than the orthorectified representation generated in Blocks S120-S150, such as generated by a user device) and/or projected map by performing one or more of the following operations: densifying the feature set by extracting and matching additional features (e.g., by tracing along epipolar lines to find additional pixel matches between different frames), performing additional bundle adjustments (e.g., unrestricted bundle adjustments, bundle adjustments using the densified feature set, etc.), determining meshes, determining mesh textures, generating orthorectified representations and/or projected maps based on the determined information, and/or any other suitable processing operations. In some embodiments, the orthorectified representation and/or projected map is displayed to the user (e.g., analogously to the rendering described above regarding Block 150, such as shown in FIG. 5; at a different device and/or a later time; etc.). However, the orthorectified representation and/or projected map can additionally or alternatively be used in any other suitable manner.

The method 100 can additionally or alternatively include Block S180, which recites: generating an analysis from at least one of the orthorectified representation and the projected map of the region of interest. Block S180 can include performing photogrammetry-relevant measurements and/or providing outputs in terms of distance measurements, area measurements, volume measurements, and/or any other suitable measurements from the region of interest. Block S180 can additionally or alternatively include performing analyses of homogenous terrain, and/or identification of anomalies within mapped homogenous terrain (e.g., in the context of rescue missions, etc.). Block S180 can additionally or alternatively include performing graphical annotations of the region of interest according to known or custom indices (e.g., in relation to plant health analysis (e.g., NDVI Analysis, VARI analysis, OSAVI analysis, etc.), in relation to other normalized indices, in relation to other enhanced indices, etc.). Block S180 can additionally or alternatively include performing automated map cropping and/or other image analysis techniques to facilitate observation of the region of interest. Block S180 can additionally or alternatively include implementing thermal analyses of the region(s) of interest, in relation to identifying areas associated with differences in temperature from expected temperature profiles. Such applications of thermal analyses can be used for search and rescue missions, livestock counting/livestock population analyses, population analysis associated with other organisms, and/or any other suitable type of analysis. Block S180 can be performed by the same device(s) that perform any or all of Blocks S120-S170, generated by different devices (e.g., by a remote computing system, such as an internet-connected server), and/or generated in any other suitable manner. However, Block S180 can additionally or alternatively include generation of any other suitable analysis.

Figure 7:
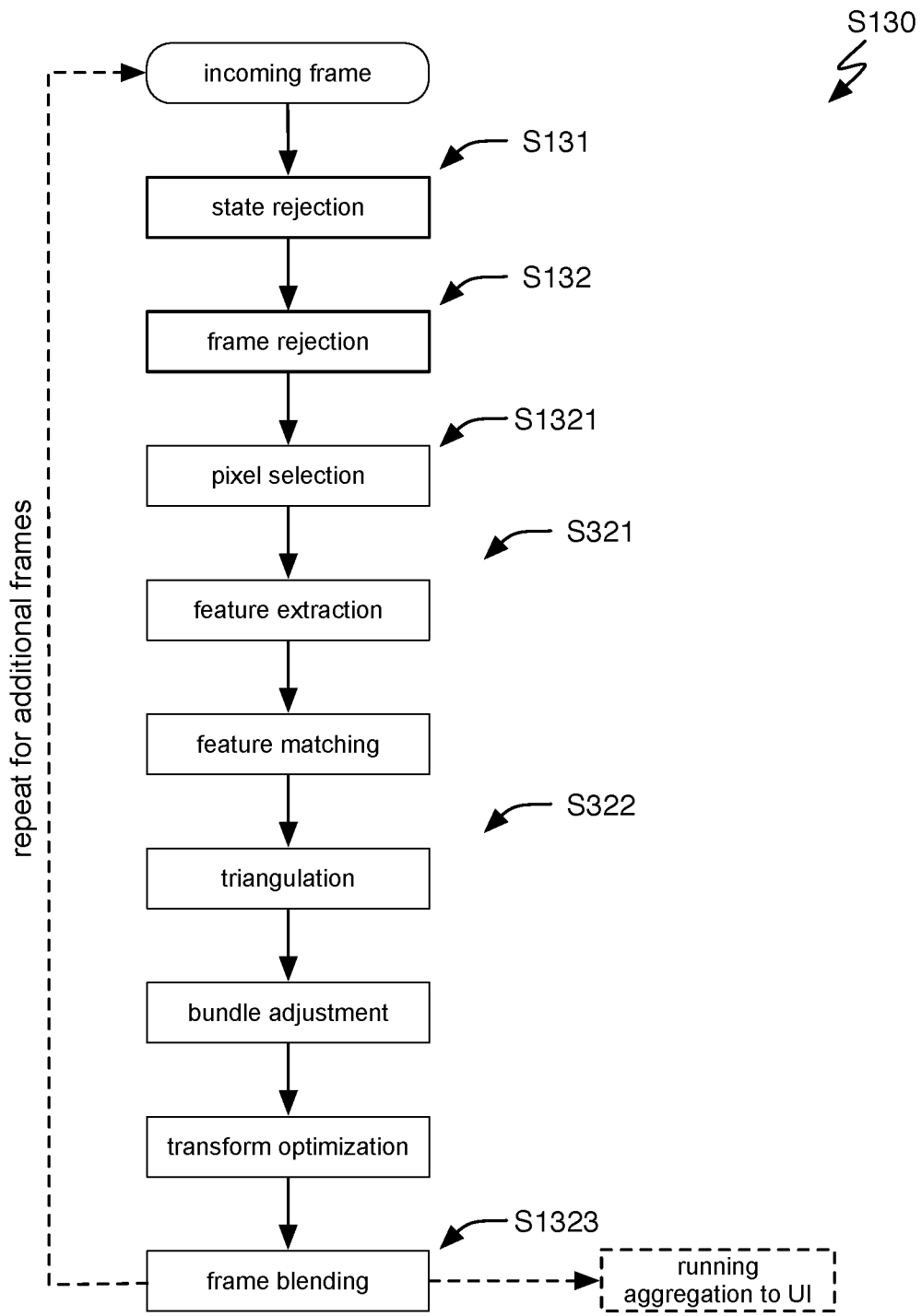
FIG. 7 is a flowchart representation of a variation of an embodiment of generating the image subassembly.

In some variations (e.g., as shown in FIG. 7), the method includes (e.g., in Block S130), for each image frame captured during mission performance (or a subset thereof), one or more of: a state rejection operation; a frame rejection operation; a pixel selection operation; a feature extraction operation; a feature matching operation; a triangulation operation; a bundle adjustment operation; a transform optimization operation; and a frame blending operation. However, the method 100 can additionally or alternatively include any other suitable elements performed in any suitable manner.

While the method 100 above is described in the context of one or a limited number of UAVs, the method 100 can additionally or alternatively be implemented using multiple UAVs. For instance, the method 100 can implement a UAV fleet configured to sweep the region of interest, wherein each UAV has jurisdiction over at least one subportion of the region of interest, follows a flight path over its jurisdiction (s), and then modified frame processing and/or images subassembly processing occurs according to variants of Blocks S130-S140 above. Furthermore, if one UAV in the fleet is incapable of and/or delayed in executing and/or completing its mission (e.g., the UAV is disabled, the UAV performs portions of the mission more slowly than expected, etc.), one or more other UAVs in the fleet can perform the mission of the incapable UAV (e.g., upon completion of its own mission). However, multiple UAVs can be configured in any other suitable manner to perform variations of the method 100.

The methods and/or systems of the invention can be embodied and/or implemented at least in part in the cloud and/or as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the embodiments of the invention without departing from the scope of this invention as defined in the following claims.

We claim:

1. A computer-implemented method comprising:
   receiving a first frame of a region of interest captured by a camera of an unmanned aerial vehicle (UAV) in association with a first camera pose;
   receiving a second frame of the region of interest captured by the camera of the UAV in association with a second camera pose;
   matching a feature of the region of interest included in the first frame with the feature of the region of interest included in the second frame, based on the first camera pose and the second camera pose;
generating an orthomosaic using the first frame and the second frame, based on matching the feature of the region of interest included in the first frame with the feature of the region of interest included in the second frame; and
performing a bundle adjustment operation to reduce a reprojection error associated with a physical feature position using only frames that are within a temporal window corresponding to a limited number of frames that are most recently captured or processed.

2. The computer-implemented method of claim 1, further comprising:
determining the first camera pose corresponding to the first frame;
determining the second camera pose corresponding to the second frame;
comparing the first camera pose and the second camera pose; and
determining motion information indicating motion between the first camera pose and the second camera pose, based on comparing the first camera pose and the second camera pose,
wherein the matching the feature of the region of interest included in the first frame with the feature of the region of interest included in the second frame comprises matching the feature of the region of interest included in the first frame with the feature of the region of interest included in the second frame based on the motion information.

3. The computer-implemented method of claim 2, wherein the determining the first camera pose comprises determining the first camera pose based on one or more of: first global positioning system (GPS) information, first pitch information, first roll information, or first yaw information of the camera corresponding to the first frame,
wherein the determining the second camera pose comprises determining the second camera pose based on one or more of: second GPS information, second pitch information, second roll information, or second yaw information of the camera corresponding to the second frame.

4. The computer-implemented method of claim 1, further comprising:
determining a first photo subset of the first frame that depicts the feature; and
determining a second photo subset of the second frame that depicts the feature,
wherein the matching the feature of the region of interest included in the first frame with the feature of the region of interest included in the second frame comprises matching the feature of the region of interest included in the first frame with the feature of the region of interest included in the second frame, based on determining the first photo subset and determining the second photo subset.

5. The computer-implemented method of claim 1, further comprising:
performing a triangulation operation to determine a physical feature position of the feature in a three-dimensional space.

6. The computer-implemented method of claim 1, further comprising:
providing the orthomosaic to an electronic device of a user to render the region of interest in near-real time at a display of the electronic device.

7. A device comprising:
a memory configured to store instructions; and
a processor configured to execute the instructions to perform operations comprising:
receiving a first frame of a region of interest captured by a camera of an unmanned aerial vehicle (UAV) in association with a first camera pose;
receiving a second frame of the region of interest captured by the camera of the UAV in association with a second camera pose;
matching a feature of the region of interest included in the first frame with the feature of the region of interest included in the second frame, based on the first camera pose and the second camera pose;
generating an orthomosaic using the first frame and the second frame, based on matching the feature of the region of interest included in the first frame with the feature of the region of interest included in the second frame; and
performing a bundle adjustment operation to reduce a reprojection error associated with a physical feature position using only frames that are within a temporal window corresponding to a limited number of frames that are most recently captured or processed.

8. The device of claim 7, wherein the operations further comprise:
determining the first camera pose corresponding to the first frame;
determining the second camera pose corresponding to the second frame;
comparing the first camera pose and the second camera pose; and
determining motion information indicating motion between the first camera pose and the second camera pose, based on comparing the first camera pose and the second camera pose,
wherein the matching the feature of the region of interest included in the first frame with the feature of the region of interest included in the second frame comprises matching the feature of the region of interest included in the first frame with the feature of the region of interest included in the second frame based on the motion information.

9. The device of claim 8, wherein the determining the first camera pose comprises determining the first camera pose based on one or more of: first global positioning system (GPS) information, first pitch information, first roll information, or first yaw information of the camera corresponding to the first frame, and
wherein the determining the second camera pose comprises determining the second camera pose based on one or more of: second GPS information, second pitch information, second roll information, or second yaw information of the camera corresponding to the second frame.

10. The device of claim 7, wherein the operations further comprise:
determining a first photo subset of the first frame that depicts the feature; and
determining a second photo subset of the second frame that depicts the feature,
wherein the matching the feature of the region of interest included in the first frame with the feature of the region of interest included in the second frame comprises matching the feature of the region of interest included in the first frame with the feature of the region of interest included in the second frame, based on determining the first photo subset and determining the second photo subset.

11. The device of claim 7, wherein the operations further comprise:
performing a triangulation operation to determine a physical feature position of the feature in a three-dimensional space.

12. The device of claim 7, wherein the operations further comprise:
providing the orthomosaic to an electronic device of a user to render the region of interest in near-real time at a display of the electronic device.

13. A non-transitory computer-readable medium configured to store instructions that, when executed by a processor, perform operations comprising:
receiving a first frame of a region of interest captured by a camera of an unmanned aerial vehicle (UAV) in association with a first camera pose;
receiving a second frame of the region of interest captured by the camera of the UAV in association with a second camera pose;
matching a feature of the region of interest included in the first frame with the feature of the region of interest included in the second frame, based on the first camera pose and the second camera pose;
generating an orthomosaic using the first frame and the second frame, based on matching the feature of the region of interest included in the first frame with the feature of the region of interest included in the second frame; and
performing a bundle adjustment operation to reduce a reprojection error associated with a physical feature position using only frames that are within a temporal window corresponding to a limited number of frames that are most recently captured or processed.

14. The non-transitory computer-readable medium of claim 13, wherein the operations further comprise:
determining the first camera pose corresponding to the first frame;
determining the second camera pose corresponding to the second frame;
comparing the first camera pose and the second camera pose; and
determining motion information indicating motion between the first camera pose and the second camera pose, based on comparing the first camera pose and the second camera pose,
wherein the matching the feature of the region of interest included in the first frame with the feature of the region of interest included in the second frame comprises matching the feature of the region of interest included in the first frame with the feature of the region of interest included in the second frame based on the motion information.

15. The non-transitory computer-readable medium of claim 14, wherein the determining the first camera pose comprises determining the first camera pose based on one or more of: first global positioning system (GPS) information, first pitch information, first roll information, or first yaw information of the camera corresponding to the first frame, and
wherein the determining the second camera pose comprises determining the second camera pose based on one or more of: second GPS information, second pitch information, second roll information, or second yaw information of the camera corresponding to the second frame.

16. The non-transitory computer-readable medium of 13, wherein the operations further comprise:
determining a first photo subset of the first frame that depicts the feature; and
determining a second photo subset of the second frame that depicts the feature,
wherein the matching the feature of the region of interest included in the first frame with the feature of the region of interest included in the second frame comprises matching the feature of the region of interest included in the first frame with the feature of the region of interest included in the second frame, based on determining the first photo subset and determining the second photo subset.

17. The non-transitory computer-readable medium of claim 13, wherein the operations further comprise:
performing a triangulation operation to determine a physical feature position of the feature in a three-dimensional space; and
performing a bundle adjustment operation to reduce a reprojection error associated with the physical feature position.

18. The non-transitory computer-readable medium of claim 13, wherein the operations further comprise:
providing the orthomosaic to an electronic device of a user to render the region of interest in near-real time at a display of the electronic device.

* * * * *